(12) United States Patent
Xiao et al.

(10) Patent No.: US 11,475,857 B2
(45) Date of Patent: Oct. 18, 2022

(54) ARRAY SUBSTRATE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenjun Xiao, Beijing (CN); Yang Wang, Beijing (CN); Shijun Wang, Beijing (CN); Bo Feng, Beijing (CN); Xiaoxiao Chen, Beijing (CN); Bingqing Yang, Beijing (CN); Wenkai Mu, Beijing (CN); Zhiying Bao, Beijing (CN)

(73) Assignees: Beijing Boe Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/939,427

(22) Filed: Jul. 27, 2020

(65) Prior Publication Data

US 2021/0049971 A1 Feb. 18, 2021

(30) Foreign Application Priority Data

Aug. 16, 2019 (CN) .......................... 201921334374.1

(51) Int. Cl.
*G09G 3/36* (2006.01)
*G06F 3/041* (2006.01)

(52) U.S. Cl.
CPC ......... *G09G 3/3614* (2013.01); *G06F 3/0412* (2013.01); *G09G 2300/0443* (2013.01); *G09G 2300/0452* (2013.01); *G09G 2320/0233* (2013.01)

(58) Field of Classification Search
CPC combination set(s) only.
See application file for complete search history.

(56) References Cited

U.S. PATENT DOCUMENTS

| 2011/0032249 A1* | 2/2011 | Moon | G09G 3/3614 345/214 |
| 2012/0092241 A1* | 4/2012 | Shang | G09G 3/3648 345/96 |
| 2014/0111410 A1* | 4/2014 | Guo | G09G 3/3614 345/88 |
| 2019/0025965 A1* | 1/2019 | Yang | G06F 3/04184 |

* cited by examiner

*Primary Examiner* — Robin J Mishler
(74) *Attorney, Agent, or Firm* — Leason Ellis LLP

(57) ABSTRACT

An array substrate and a display device are provided. The array substrate includes sub-pixels arranged in a first direction and a second direction, gate lines extending in the first direction and data lines extending in the second direction. The data lines include a first data line and a second data line alternately arranged, the first data line and the second data line are respectively configured to transmit voltages of different polarities, and different sub-pixels connected to a same data line are connected to different gate lines. Two adjacent sub-pixels arranged in the first direction are respectively connected to the first data line and the second data line, and one column of sub-pixels extending in the second direction are connected to the first data line, or one column of sub-pixels extending in the second direction are connected to the second data line.

20 Claims, 3 Drawing Sheets

| 110 | 120 | 130 | 110 | 120 | 130 | 110 | 120 | 130 | 110 | 120 | 130 |
|---|---|---|---|---|---|---|---|---|---|---|---|
| +↓ | −↑ | + | − | +↓ | −↑ | + | − | +↓ | −↑ | + | − |
| + | − | +↓ | −↑ | + | − | +↓ | −↑ | + | − | +↓ | −↑ |
| +↓ | −↑ | + | − | +↓ | −↑ | + | − | +↓ | −↑ | + | − |
| + | − | +↓ | −↑ | + | − | +↓ | −↑ | + | − | +↓ | −↑ |

# ARRAY SUBSTRATE AND DISPLAY DEVICE

The present application claims priority of Chinese Patent Application No. 201921334374.1, filed on Aug. 16, 2019, and the entire content disclosed by the Chinese patent application is incorporated herein by reference as part of the present application for all purposes.

TECHNICAL FIELD

At least one embodiment of the present disclosure relates to an array substrate and a display device.

BACKGROUND

A dual gate technology is a driving technology of reducing the quantity of data lines in a display device by half and doubling the quantity of gate lines in the display device, that is, the quantity of source drive integrated circuits connected to the data lines is halved, and the quantity of gate drive integrated circuits connected to the gate lines is doubled. Because the unit price of the gate drive integrated circuit is cheaper than the unit price of the source drive integrated circuit, thereby achieving to reduce the cost.

SUMMARY

At least one embodiment of the present disclosure relates to an array substrate and a display device. The array substrate includes a plurality of sub-pixels arranged in an array along a first direction and a second direction, the first direction and the second direction intersect; a plurality of gate lines extending in the first direction and arranged in the second direction; and a plurality of data lines extending in the second direction and arranged in the first direction. The plurality of data lines include a first data line and a second data line alternately arranged in the first direction, two columns of sub-pixels extending in the second direction and arranged in the first direction are arranged between the first data line and the second data line, the first data line and the second data line are respectively configured to transmit voltages of different polarities, and different sub-pixels connected to a same data line are connected to different gate lines. Two adjacent sub-pixels arranged in the first direction are respectively connected to the first data line and the second data line, and one column of sub-pixels extending in the second direction are connected to the first data line, or one column of sub-pixels extending in the second direction are connected to the second data line.

In some examples, the plurality of gate lines include a first gate line and a second gate line alternately arranged in the second direction, a gate line pair formed by the first gate line and the second gate line is provided between two adjacent sub-pixels arranged in the second direction.

In some examples, the one column of sub-pixels extending in the second direction are all connected to a same data line.

In some examples, among the sub-pixels arranged in the first direction, an odd number of sub-pixels are provided between two sub-pixels connected to a same data line.

In some examples, among the sub-pixels arranged in the first direction, one sub-pixel is provided between the two sub-pixels connected to the same data line.

In some examples, among the sub-pixels arranged in the first direction, two sub-pixels located on both sides of a same data line and next to the same data line are connected to a same gate line.

In some examples, among the sub-pixels arranged in the first direction, two sub-pixels located on both sides of a same data line and next to the same data line are connected to different data lines.

In some examples, the plurality of sub-pixels are divided into a first sub-pixel group and a second sub-pixel group alternately arranged in the first direction, each sub-pixel group includes two columns of sub-pixels extending in the second direction and arranged in the first direction; one sub-pixel group is between the first data line and the second data line, which are adjacent, and two sub-pixels arranged in the first direction in a respective sub-pixel group are respectively connected to the first data line and the second data line on both sides of the respective sub-pixel group, each of the sub-pixels in the first sub-pixel group is connected to the data line close to the sub-pixel, and each of the sub-pixels in the second sub-pixel group is connected to the data line away from the sub-pixel.

In some examples, one column of sub-pixels extending in the second direction have the same color, and the two adjacent sub-pixels arranged in the first direction have different colors.

In some examples, adjacent sub-pixels with a same color and arranged in the first direction are respectively connected to the first data line and the second data line.

In some examples, a touch electrode line extending in the second direction is between the two columns of sub-pixels between the first data line and the second data line.

At least one embodiment of the present disclosure provides a display device including an array substrate, the array substrate includes a plurality of sub-pixels arranged in an array along a first direction and a second direction, wherein the first direction and the second direction intersect; a plurality of gate lines extending in the first direction and arranged in the second direction; and a plurality of data lines extending in the second direction and arranged in the first direction, wherein the plurality of data lines comprise a first data line and a second data line alternately arranged in the first direction, two columns of sub-pixels extending in the second direction and arranged in the first direction are arranged between the first data line and the second data line, the first data line and the second data line are respectively configured to transmit voltages of different polarities, and different sub-pixels connected to a same data line are connected to different gate lines. Two adjacent sub-pixels arranged in the first direction are respectively connected to the first data line and the second data line, and one column of sub-pixels extending in the second direction are connected to the first data line, or one column of sub-pixels extending in the second direction are connected to the second data line.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

During the research, the inventor of the present application found that a display device adopting the double gate technology is prone to display defects such as V-line in a case where a column inversion driving method is applied to the display device, that is, the user may observe periodic vertical stripes of light and dark on the display screen when the user shakes his head.

Figure 1A:
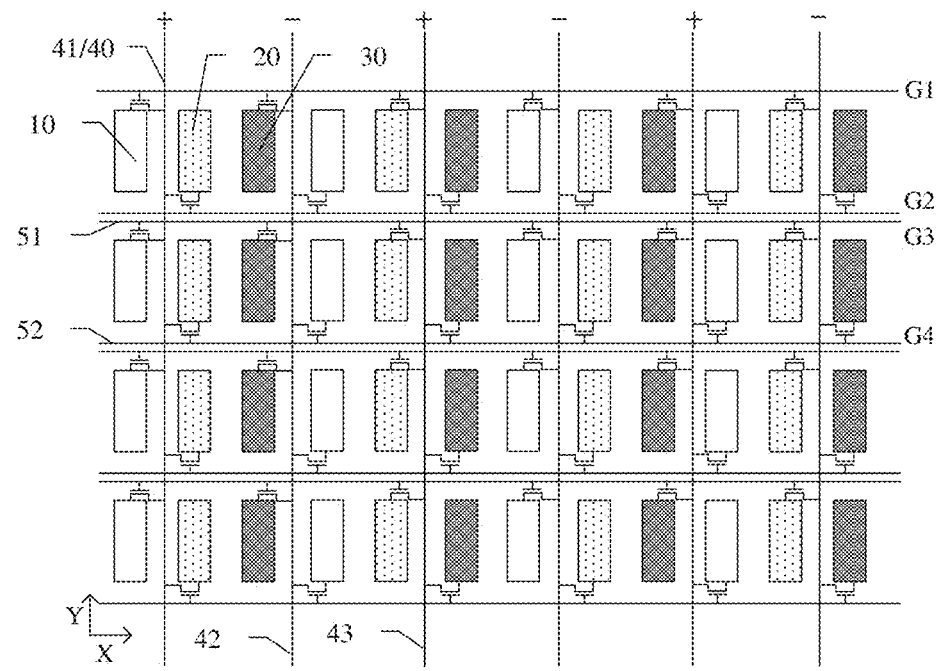
FIG. 1A is a schematic diagram of a partial structure of a double gate array substrate.

FIG. 1A is a schematic diagram of a partial structure of a double gate array substrate. As shown in FIG. 1A, the array substrate includes a plurality of sub-pixels arranged in an array along a X direction (row direction) and a Y direction (column direction), the plurality of sub-pixels may include a red sub-pixel 10, a green sub-pixel 20, and a blue sub-pixel 30. The array substrate further includes data lines 40 extending in the Y direction, and first gate lines 51 and second gate lines 52 extending in the X direction, and sub-pixels in two columns are disposed between adjacent two data lines 40. The first gate line 51 and the second gate line 52 are located on both sides of each row of sub-pixels in the Y direction, respectively. Sub-pixels located on both sides of any data line 40 and next to the data line 40 are connected to the data line 40, for example, the red sub-pixel 10 and the green sub-pixel 20 (or blue sub-pixel 30), which is adjacent to the red sub-pixel 10, are both connected to the data line 40 between the red sub-pixel 10 and the green sub-pixel 20 (or blue sub-pixel 30). The above-mentioned "sub-pixel next to the data line 40" means that there is no other sub-pixel between the sub-pixel and the data line. Different sub-pixels connected to the same data line 40 are connected to different gate lines. For example, among the sub-pixels arranged in the X direction, one sub-pixel of the two sub-pixels, which are connected to the same data line 40, is connected to the first gate line 51 and the other sub-pixel of the two sub-pixels is connected to the second gate line 52.

As shown in FIG. 1A, a display device including the array substrate shown in FIG. 1A may be driven by a column inversion method. The column inversion method refers to inverting the polarity of the display data every predetermined number of sub-pixel columns. For the column inversion method, in one frame, the polarity of the data signal in each data line is always the same polarity (positive polarity or negative polarity). As shown in FIG. 1A, the polarities of the voltage stored in two sub-pixel columns connected to the same data line 40 are the same, and the polarities of the voltage stored in two sub-pixel columns respectively connected to two adjacent data lines 40 are opposite.

As shown in FIG. 1A, in one frame, the polarity of the data signal in the first data line 41 is a positive polarity, the polarity of the data signal in the second data line 42 is a negative polarity, and the polarity of the data signal in the third data line 43 is a positive polarity, and so on. That is, along the X direction, the polarities of the data signals in the plurality of data lines 40 alternate between the positive polarity and the negative polarity. Thus, in one frame, the two sub-pixel columns connected to the first data line 41 are charged with positive polarity data signals, the two sub-pixel columns connected to the second data line 42 are charged with negative polarity data signals, the two sub-pixel columns connected to the third data line 43 are charged with positive polarity data signals, and so on. Therefore, in one frame, the polarities of the data signals charged into a plurality of sub-pixel columns arranged in the X direction are arranged in a periodic cycle of positive, positive, negative, and negative.

As shown in FIG. 1A, in one frame, polarities of the data signals charged into the two sub-pixel columns between the first data line 41 and the second data line 42 are positive and negative, respectively. Thus, in one frame, the brightness of two sub-pixel columns between two adjacent data lines can be averaged. However, in one frame, the polarities of the data signals charged into the four sub-pixel columns between the first data line 41 and the third data line 43 are positive, negative, negative, and positive, respectively. The polarities of the data signals charged into the two adjacent sub-pixel columns located in the middle are the same. When there is a case that the polarities of the data signals charged into two adjacent sub-pixel columns are the same, in the same frame, the overall brightness-darkness of the sub-pixels distributed on the array substrate may not be neutralized. It is necessary to change the polarity of the data signal in each data line in the next frame to ensure that the overall brightness of the sub-pixels distributed on the array substrate may be uniform.

Figure 1B:
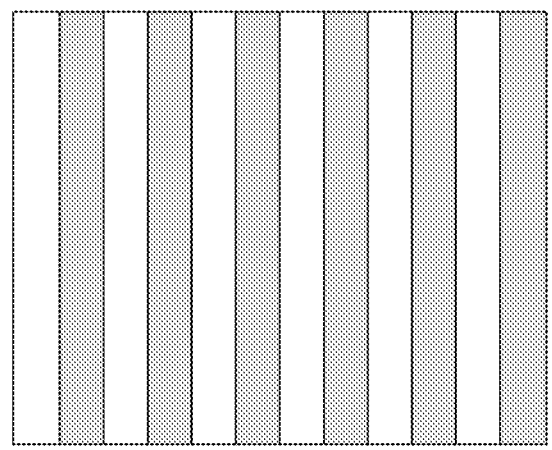
FIG. 1B is a schematic diagram of periodic vertical stripes generated in a case where the array substrate shown in FIG. 1A is used for display.

In a case where the user's eyes are fixed and continue to observe the display device including the array substrate as shown in FIG. 1A, because the polarities of the data signals in the data lines in the next frame will be reversed, in adjacent frames, after the brightness of each sub-pixel column is superimposed, the brightness is uniform; however, in a case where the user shakes his head, there may be a case of frame loss of the observed picture, resulting in that the adjacent two sub-pixel columns, whose brightness cannot be averaged in the same frame, lose the possibility that the brightness of the adjacent two sub-pixel columns is neutralized in the next frame, thereby generating periodic vertical stripes as shown in FIG. 1B.

Figure 1C:
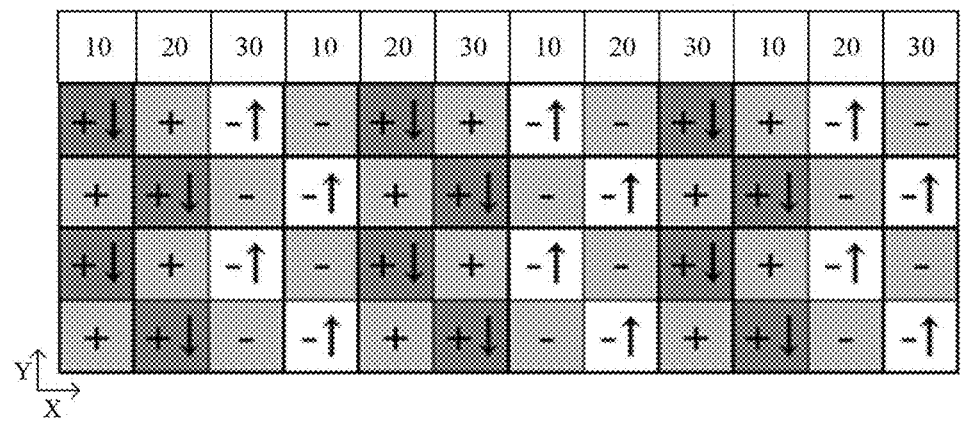
FIG. 1C is a brightness distribution diagram of some sub-pixels of a pixel structure shown in FIG. 1A.

FIG. 1C is a brightness distribution diagram of some sub-pixels of the pixel structure shown in FIG. 1A. As shown in FIG. 1A and FIG. 1C, the sequence of turning on the gate lines in the array substrate is G1-G2-G4-G3, that is, the gate lines on the above-mentioned array substrate turn on the sub-pixels in a bow scan column inversion manner. Because the above array substrate is a double gate array substrate, the gate line will couple and pull the sub-pixels, which are adjacent to and are not connected to the gate line, resulting in that the brightness of the two adjacent sub-pixels is different and cannot be neutralized, and the brightness of adjacent sub-pixel columns having the same color is also different and cannot be neutralized, so that it is prone to V-lines. The above-mentioned coupling and pulling means that a coupling capacitor is formed between the gate line and the sub-pixel, which is adjacent to and is not connected to the gate line. In a case where the voltage on the gate line jumps, the capacitive coupling effect causes the pixel voltage of the sub-pixel, which is adjacent to and is not connected to the gate line, to jump, thereby causing the pixel brightness to change.

For example, as shown in FIGS. 1A and 1C, in a case where the gate signal input to the gate line G1 is at an effective level (a level at which the thin film transistor can be turned on), the gate line G1 applies a turn-on voltage to the thin film transistor included in the first color sub-pixel 10 in the first row and first column, and the first color sub-pixel 10 is charged; in a case where the gate signal is input to the gate line G2, the coupling capacitor generated between the first color sub-pixel 10 and the gate line G2 causes the pixel voltage Vp of the first color sub-pixel 10 to jump. Therefore, in a case where the data signal input to the sub-pixel affected by the coupling capacitor has a positive polarity, the brightness of the sub-pixel becomes darker (as shown in FIG. 1C, the plus sign in the sub-pixel in the first row and first column indicates that the input data signal has a positive polarity, and the down arrow indicates that the brightness becomes darker); in a case where the data signal input to the sub-pixel affected by the coupling capacitor has a negative polarity, the brightness of the sub-pixel becomes brighter (as shown in FIG. 1C, the minus sign in the sub-pixel in the first row and third column indicates that the input data signal has a negative polarity, and the up arrow indicates that the brightness becomes brighter); regardless of whether the data signal input to the sub-pixel that is not affected by the coupling capacitor has a positive polarity or a negative polarity, the brightness of the sub-pixel is unchanged (as shown in FIG. 1C, the brightness of the sub-pixel located in the first row and second column and the brightness of the sub-pixel located in the first row and the fourth column are unchanged).

As shown in FIG. 1C, in a case where the gate lines on the above array substrate turn on the sub-pixels by the column inversion method, the phenomenon of uneven brightness occurs in the sub-pixels as a whole, which causes a frame drop phenomenon when the user shakes his head to view the display device, thereby generating vertical stripes.

The embodiments of the present disclosure provide an array substrate and a display device. The array substrate includes: a plurality of sub-pixels arranged in an array along a first direction and a second direction, a plurality of gate lines extending in the first direction and arranged in the second direction, and a plurality of data lines extending in the second direction and arranged in the first direction. The plurality of data lines include a first data line and a second data line, which are alternately arranged in the first direction, sub-pixels in two columns of the plurality of sub-pixels extending in the second direction and arranged in the first direction are arranged between the first data line and the second data line, the first data line and the second data line are respectively configured to transmit voltages of different polarities, and different sub-pixels connected to a same data line are connected to different gate lines. Two adjacent sub-pixels arranged in the first direction are respectively connected to the first data line and the second data line, one column of the sub-pixels extending in the second direction are connected to the first data line, or one column of sub-pixels extending in the second direction are connected to the second data line. In the display device using the array substrate provided by the embodiments of the present disclosure, the brightness distribution of the respective sub-pixels in the same frame of the display picture is uniform so as to avoid poor V-lines as much as possible.

The array substrate and the display device provided by the embodiments of the present disclosure will be described below with reference to the drawings.

Figure 2A:
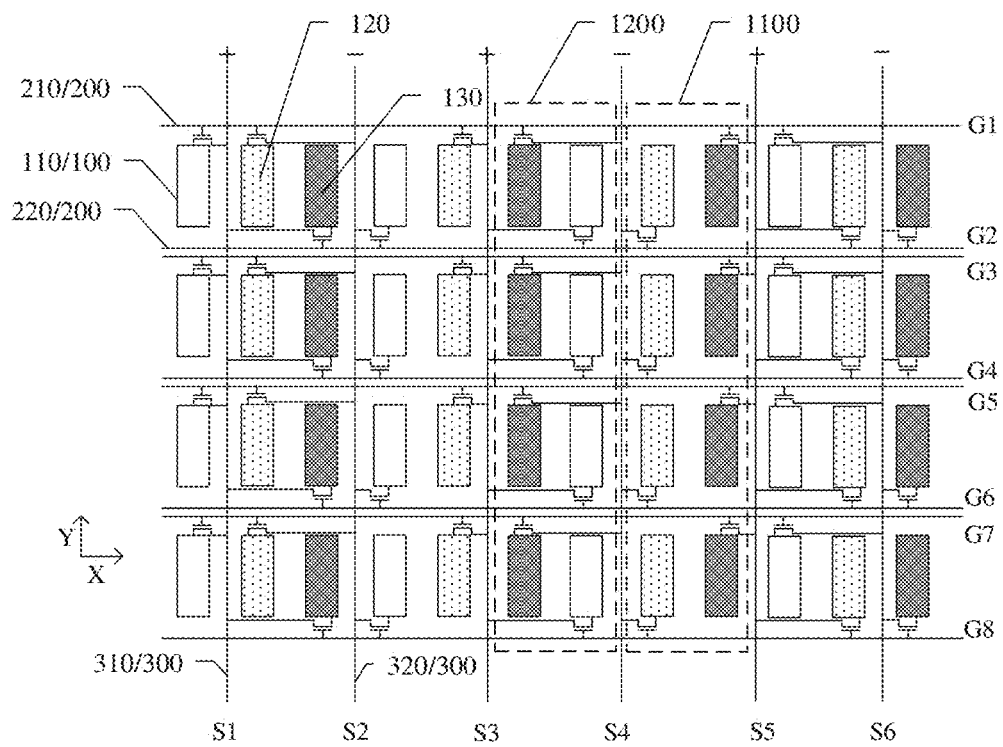
FIG. 2A is a schematic diagram of an array substrate provided by an example of an embodiment of the present disclosure.

FIG. 2A shows an array substrate provided according to an embodiment of the present disclosure. As shown in FIG. 2A, the array substrate includes: a plurality of sub-pixels 100 arranged in an array along a first direction and a second direction, a plurality of gate lines 200 extending in the first direction, and a plurality of data lines 300 extending in the second direction. For example, the embodiments of the present disclosure schematically show that a direction parallel to a X direction in FIG. 2A is taken as the first direction, and a direction parallel to a Y direction is taken as the second direction. The embodiments of the present disclosure are not limited thereto, the first direction and the second direction may be interchanged. The first direction and the second direction intersect, for example, the first direction and the second direction are substantially perpendicular.

As shown in FIG. 2A, the plurality of data lines 300 include first data lines 310 and second data lines 320, which are alternately arranged in the first direction, two columns of the sub-pixels 100 extending in the second direction and arranged in the first direction are arranged between the first data line 310 and the second data line 320. In the embodiments of the present disclosure, taking a plurality of sub-pixels 100 arranged in the Y direction as a sub-pixel column as an example, two sub-pixel columns are provided between the first data line 310 and the second data line 320. The first data line 310 and the second data line 320 are respectively configured to transmit data signals of different polarities, and different sub-pixels 100 connected to the same data line 300 are connected to different gate lines 200. The transmission of the data signals of different polarities may mean that the data signal in the first data line and the data signal in the second data line have opposite polarities.

For example, the embodiment of the present disclosure exemplarily shows that the first data line 310 is configured to transmit data signals of the positive polarity, and the second data line 320 is configured to transmit data signals of the negative polarity. The embodiments of the present disclosure are not limited thereto, the first data line may also be configured to transmit data signals of the negative polarity, and the second data line may be configured to transmit data signals of the positive polarity, as long as the two data lines are configured to transmit data signals of different polarities, respectively.

As shown in FIG. 2A, two adjacent sub-pixels 100 arranged in the first direction are connected to the first data line 310 and the second data line 320, respectively, two adjacent sub-pixels 100 arranged in the second direction are connected to the first data line 310 or two adjacent sub-pixels 100 arranged in the second direction are connected to the second data line 320. That is, two adjacent sub-pixels 100 arranged in the second direction are connected to one selected from the group consisting of the first data line 310 and the second data line 320, that is, two adjacent sub-pixels 100 arranged in the second direction are connected to the data line 300 transmitting the data signals of the same polarity. Here, the adjacent two sub-pixels arranged in the second direction being connected to the data line transmitting the data signals of the same polarity may include that the sub-pixels in the same sub-pixel column are all connected to the same data line, or may include that the sub-pixels in the same sub-pixel column are connected to a plurality of data lines that transmit data signals of the same polarity.

In a case where the array substrate provided by the embodiment of the present disclosure is used to display a picture, adjacent sub-pixel columns are applied with data signals of opposite polarities in the same frame, so that the brightness distribution of the respective sub-pixels in the same frame of the display picture can be uniform, so as to avoid the appearance of V-lines as much as possible.

For example, as shown in FIG. 2A, the embodiment of the present disclosure schematically shows six data lines 300, along a direction indicated by the arrow in the X direction, the six data lines 300 are data lines S1-S6, respectively, the data lines S1, S3, and S5 are the first data lines 310 (for example, data signals of the positive polarity are input to the first data lines 310), and the data lines S2, S4, and S6 are the second data lines 320 (for example, data signals of the negative polarity are input to the second data lines 320).

For example, as shown in FIG. 2A, each sub-pixel 100 includes a thin film transistor, a gate electrode of the thin film transistor is connected to the gate line 200, one of a source electrode and a drain electrode of the thin film transistor is connected to the data line 300, and the other of the source electrode and the drain electrode of the thin film transistor is connected to a pixel electrode included in the sub-pixel 100.

In some examples, as shown in FIG. 2A, the plurality of gate lines 200 include first gate lines 210 and second gate lines 220, the first gate lines 210 and the second gate lines 220 are alternately arranged in the second direction, a gate line pair formed by one first gate line 210 and one second gate line 220 is provided between two adjacent sub-pixels 100 arranged in the second direction. In the embodiment of the present disclosure, taking a row of sub-pixels 100 arranged in the X direction as a sub-pixel row, and then the first gate line 210 and the second gate line 220 are provided between two adjacent sub-pixel rows. The array substrate provided by the embodiments of the present disclosure is a dual gate type array substrate, and a display device using the dual gate type array substrate can reduce costs.

For example, as shown in FIG. 2A, an embodiment of the present disclosure schematically shows eight gate lines, in a direction opposite to the direction indicated by the arrow in the Y direction, the eight gate lines are gate lines G1-G8, respectively. The gate lines G1, G3, G5, and G7 are the first gate lines 210, and the gate lines G2, G4, G6, and G8 are the second gate lines 220.

In some examples, as shown in FIG. 2A, among the sub-pixels 100 arranged in the first direction, sub-pixels 100, the quantity of which is odd, are provided between two sub-pixels 100 connected to the same data line 300, so that two adjacent sub-pixels 100 arranged in the first direction can be connected to the first data line 310 and the second data line 320, respectively.

For example, among the sub-pixels 100 arranged in the X direction, the quantity of sub-pixels 100 between two sub-pixels 100 connected to the same data line 300 may be one, three, or the like. For example, in order to simplify the layout of the connection line between the data line 300 and the sub-pixel 100, as shown in FIG. 2A, the quantity of sub-pixels 100 between two sub-pixels 100 connected to the same data line 300 may be set to one.

In some examples, as shown in FIG. 2A, two adjacent sub-pixels 100 arranged in the first direction are respectively connected to the first data line 310 and second data line 320 that are adjacent, which can facilitate the connection between the thin film transistor in the sub-pixel 100 and the data line 300 and save the manufacturing process cost.

In some examples, as shown in FIG. 2A, the sub-pixels 100 in the same column are all connected to the same data line 300, thereby not only ensuring that the sub-pixels in the same sub-pixel column are all connected to the data line 300 transmitting data signals of the same polarity, but also facilitating the connection between the thin film transistor in the sub-pixel 100 and the data line 300, and saving the manufacturing process cost.

In some examples, as shown in FIG. 2A, among the sub-pixels 100 arranged in the first direction, two sub-pixels 100 located on both sides of the same data line 300 and next to the same data line 300 are connected to different data lines 300. The above-mentioned "two sub-pixels 100 located on both sides of the same data line 300 and next to the same data line 300" means that there are no other sub-pixels between the two sub-pixels and the data line. In the embodiment of the present disclosure, by connecting two sub-pixels located on both sides of the data line and next to the data line to different data lines, the polarities of the data signals input to the adjacent two sub-pixel columns are no longer the same, so that the brightness of the entire display picture is uniform to avoid the appearance of V-lines as much as possible.

In some examples, as shown in FIG. 2A, among the sub-pixels 100 arranged in the first direction, two sub-pixels 100 located on both sides of the same data line 300 and next to the same data line 300 are connected to the same gate line 200. In the embodiments of the present disclosure, by connecting two sub-pixels located on both sides of the same data line and next to the same data line to the same gate line, it can be ensured that the brightness of the adjacent sub-pixel columns can be neutralized to avoid the appearance of V-lines in a case where the coupling capacitor affects the brightness of the sub-pixels.

In some examples, as shown in FIG. 2A, the plurality of sub-pixels 100 may be divided into first sub-pixel groups 1100 and second sub-pixel groups 1200 that are alternately arranged in the first direction, each sub-pixel group includes two columns of sub-pixels 100, that is, each sub-pixel group includes two sub-pixel columns. One sub-pixel group is provided between the first data line 310 and the second data line 320 that are adjacent, and the two sub-pixel columns in each sub-pixel group are respectively connected to the first data line 310 and the second data line 320, which are located on both sides of the sub-pixel group, that is, the first data line 310 and second data line 320 that are adjacent are respectively connected to two sub-pixel columns in the sub-pixel group located between the first data line 310 and second data line 320. For example, the sub-pixels 100 in the first sub-pixel group 1100 are all connected to the data line 300 close to the sub-pixels 100, and the sub-pixels 100 in the second sub-pixel group 1200 are all connected to the data line 300 away from the sub-pixels 100. That is, the sub-pixel column in the first sub-pixel group 1100 is connected to the data line 300 next to the sub-pixel column in the first sub-pixel group 1100, however, another sub-pixel column is disposed between the sub-pixel column in the second sub-pixel group 1200 and the data line 300 connected to the sub-pixel column in the second sub-pixel group 1200.

For example, as shown in FIG. 2A, the plurality of sub-pixels 100 may include first color sub-pixels 110, second color sub-pixels 120, and third color sub-pixels 130, and the sub-pixels 100 in the same column have the same color, and two adjacent sub-pixels 100 arranged in the first direction have different colors. That is, the colors of the sub-pixels 100 in the same sub-pixel column are the same, and the first color sub-pixel 110, the second color sub-pixel 120, and the third color sub-pixel 130 may be alternately arranged in the same sub-pixel row. That is, the sub-pixels 100 arranged in the X direction may be sequentially the first color sub-pixel 110, the second color sub-pixel 120, and the third color sub-pixel 130. The embodiments of the present disclosure are not limited thereto, the sub-pixels 100 arranged in the X direction may also include only sub-pixels, which are alternately arranged, of two different colors, or the sub-pixels 100 arranged in the X direction may also include sub-pixels, which are alternately arranged, of four or more different colors.

For example, the first color sub-pixel 110 may be a red sub-pixel, the second color sub-pixel 120 may be a green sub-pixel, and the third color sub-pixel 130 may be a blue sub-pixel. The embodiments of the present disclosure are not limited thereto, and colors of sub-pixels having different colors may be interchanged.

In some examples, as shown in FIG. 2A, adjacent sub-pixels 100, which have the same color and are arranged in the first direction, are connected to the first data line 310 and the second data line 320, respectively, that is, the adjacent sub-pixels 100, which have the same color and are arranged in the first direction, are respectively connected to data lines that transmit data signals of opposite polarities, so that the brightness of the adjacent sub-pixel columns of the same color can be neutralized in one frame to avoid the appearance of V-lines. The above-mentioned "adjacent sub-pixels 100, which have the same color and are arranged in the first direction" means that there is no other sub-pixel with the same color as the two sub-pixels between the two sub-pixels of the same color, but there may be sub-pixels of other colors between the two sub-pixels of the same color.

For example, as shown in FIG. 2A, the first color sub-pixels 110, which are arranged in the X direction and located in the first row, are sequentially connected to the data line S1, the data line S2, the data line S3, and the data line S6, the second color sub-pixels 120, which are arranged in the X direction and are located in the first row, are sequentially connected to the data line S2, the data line S3, the data line S4, and the data line S5, and the third color sub-pixels 130, which are arranged in the X direction and are located in the first row, are sequentially connected to the data line S1, the data line S4, the data line S5, and the data line S6, thereby ensuring that adjacent sub-pixels, which have the same color and are arranged in the first direction, are input with data signals of different polarities, respectively, so as to ensure the uniformity of the brightness of the final display picture.

Figures 2B, 3:
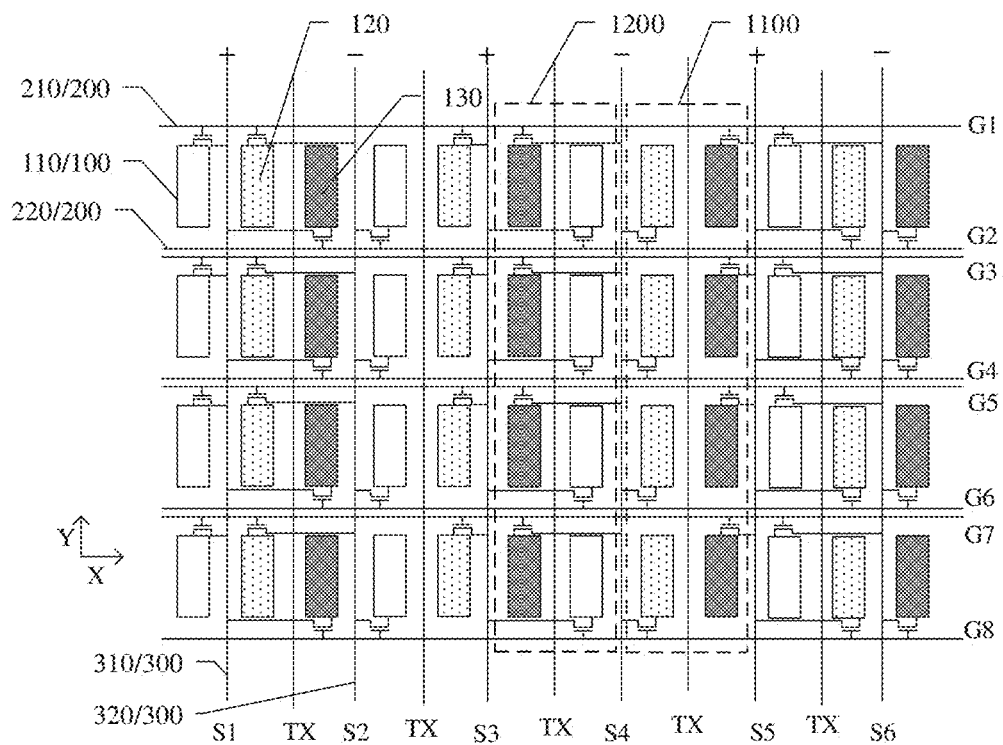
FIG. 2B is a brightness distribution diagram of sub-pixels in the array substrate shown in FIG. 2A.
FIG. 3 is a schematic diagram of an array substrate provided by another example of an embodiment of the present disclosure.

For example, FIG. 3 is a schematic diagram of a partial planar structure of an array substrate provided by another example of the present disclosure. The difference between the example shown in FIG. 3 and the example shown in FIG. 2A is that in this example shown in FIG. 3, a touch electrode line TX for touch control may also be provided between two sub-pixel columns between the first data line 310 and the second data line 320 that are adjacent, and the touch electrode line TX is parallel to the data line 300.

For example, FIG. 2B is a brightness distribution diagram of sub-pixels in the array substrate shown in FIG. 2A. As shown in FIG. 2A, among the sub-pixels 100 located in the first row and arranged in the X direction, the first sub-pixel is connected to the gate line G1 and the data line S1, the second sub-pixel 120 is connected to the gate line G1 and the data line S2, the third sub-pixel 130 is connected to the gate line G2 and the data line S1, the fourth sub-pixel 110 is connected to the gate line G2 and the data line S2, the fifth sub-pixel 120 is connected to the gate line G1 and the data line S3, the sixth sub-pixel 130 is connected to the gate line G1 and the data line S4, the seventh sub-pixel 110 is connected to the gate line G2 and the data line S3, the eighth sub-pixel 120 is connected to the gate line G2 and the data line S4, the ninth sub-pixel 130 is connected to the gate line G1 and the data line S5, the tenth sub-pixel 110 is connected to the gate line G1 and the data line S6, the eleventh sub-pixel 120 is connected to the gate line G2 and the data line S5, and the twelfth sub-pixel 130 is connected to the gate line G2 and the data line S6. The data lines 51, S3, and S5 are configured to transmit data signals with the positive polarity, and the data lines S2, S4, and S6 are configured to transmit data signals with the negative polarity.

For example, the embodiments of the present disclosure takes a case that the turn-on order of the gate lines in the array substrate is G1-G2-G4-G3-G5-G6-G8-G7 as an example for description. The embodiments of the present disclosure are not limited to this aspect, and the turn-on order of the gate lines may also adopt other orders.

For example, as shown in FIGS. 2A and 2B, taking the sub-pixels located in the first row, the gate line G1, and the gate line G2 as an example for description, in a case where the gate signal input to the gate line G1 is at an effective level, the gate line G1 applies the turn-on voltages to the thin film transistors of the first sub-pixel, the second sub-pixel, the fifth sub-pixel, the sixth sub-pixel, the ninth sub-pixel, and the tenth sub-pixel, which are connected to the gate line G1, the above six sub-pixels are charged, and the above-mentioned effective level refers to a voltage that can turn on the thin film transistor; and then, after the gate signal is input to the gate line G2, the pixel voltages in the above six sub-pixels are affected by the coupling capacitors generated between the six sub-pixels and the gate line G2, and thus produce voltage jump. Because the first sub-pixel, the fifth sub-pixel, and the ninth sub-pixel are connected to the data lines transmitting the data signal with the positive polarity, the brightness of the first sub-pixel, the fifth sub-pixel, and the ninth sub-pixel will become darker (the plus sign shown in FIG. 2B indicates that the polarity of the input data signal is positive, and the down arrow indicates the brightness of the sub-pixel becomes darker); because the second sub-pixel, the sixth sub-pixel, and the tenth sub-pixel are connected to the data lines transmitting the data signal with the negative polarity, the brightness of the second sub-pixel, the sixth sub-pixel, and the tenth sub-pixel will become brighter (the minus sign shown in FIG. 2B indicates that the polarity of the input data signal is negative, and the up arrow indicates that the brightness of the sub-pixel becomes brighter); because the pixel voltages of the third sub-pixel, the fourth sub-pixel, the seventh sub-pixel, the eighth sub-pixel, the eleventh sub-pixel, and the twelfth sub-pixel, which are in the first row and connected to the gate line G2, are not affected by the coupling capacitors, the brightness of the third sub-pixel, the fourth sub-pixel, the seventh sub-pixel, the eighth sub-pixel, the eleventh sub-pixel, and the twelfth sub-pixel is unchanged (as shown in FIG. 2B, the brightness of the sub-pixels without the up arrow or down arrow is not unchanged). Therefore, the brightness distribution of the sub-pixels in the first row and arranged in the X direction are darkest, brightest, medium bright, medium bright, darkest, brightest, medium bright, medium bright, darkest, brightest, medium bright, and medium bright, the brightness of two adjacent sub-pixel columns can be neutralized, and the brightness finally displayed can be regarded as medium bright, so as to avoid the appearance of V-lines. In the same way, the brightness change rule of other sub-pixels shown in FIG. 2B is the same as above. Therefore, in the embodiments of the present disclosure, by adjusting the connection relationship between the thin film transistors in the sub-pixels and the data lines, the brightness of two adjacent sub-pixel columns is neutralized as much as possible, so that the brightness of the display device including the above pixel structure in the same frame of the display picture is uniform, and the appearance of V-lines is avoided.

For example, the above array substrate may be an array substrate used for a liquid crystal display panel. Each sub-pixel may include a pixel electrode, and the pixel electrode is connected to a corresponding data line.

For example, the above data lines can be divided into odd-numbered column data lines and even-numbered column data lines according to the arrangement order in the first direction. The odd-numbered column data lines and the even-numbered column data lines are alternately arranged. For example, the odd-numbered column data lines may be configured to be applied with data signals with the positive polarity, the even-numbered column data lines may be configured to be applied with data signals with the negative polarity; or, the odd-numbered column data lines may be configured to be applied with data signals with the negative polarity, the even-numbered column data lines may be configured to be applied with data signals with the positive polarity.

For example, the application of the data signals with the positive polarity and the data signals with the negative polarity can be controlled by a data driver connected to the data lines. For example, the data driver is configured to apply data signals with the positive polarity to the odd-numbered column data lines and data signals with the negative polarity to the even-numbered column data lines; alternatively, the data driver is configured to apply data signal with the negative polarity to the odd-numbered column data lines and apply data signals with the positive polarity to the even-numbered column data lines.

Another embodiment of the present disclosure provides a display device including the above array substrate. In the display device provided by the embodiments of the present disclosure, the brightness distribution of the respective sub-pixels in the same frame of the display picture is uniform, so as to avoid the appearance of V-lines as much as possible.

For example, the display device may be a liquid crystal display device and may include any product or component with a display function and including the liquid crystal display device, such as a TV, a digital camera, a mobile phone, a watch, a tablet computer, a notebook computer, a navigator, etc., and the embodiments are not limited thereto.

The following statements should be noted:

(1) The accompanying drawings of the embodiment(s) of the present disclosure involve only the structure(s) in connection with the embodiment(s) of the present disclosure, and other structure(s) can be referred to common design(s).

(2) In case of no conflict, the features in one embodiment or different embodiments of the present disclosure can be combined with each other.

The foregoing embodiments merely are exemplary embodiments of the present disclosure, but the protection scope of the present disclosure is not limited thereto. Therefore, the protection scope of the present disclosure shall be subject to the scope of protection of the appended claims.

What is claimed is:

1. An array substrate, comprising:
   a plurality of sub-pixels arranged in an array along a first direction and a second direction, wherein the first direction and the second direction intersect;
   a plurality of gate lines extending in the first direction and arranged in the second direction; and
   a plurality of data lines extending in the second direction and arranged in the first direction, wherein the plurality of data lines comprise a first data line and a second data line alternately arranged in the first direction, two columns of sub-pixels extending in the second direction and arranged in the first direction are arranged between the first data line and the second data line, the first data line and the second data line are respectively configured to transmit voltages of different polarities, and different sub-pixels connected to a same data line are connected to different gate lines;
   wherein two adjacent sub-pixels arranged in the first direction are respectively connected to the first data line and the second data line, and
   one column of sub-pixels extending in the second direction are connected to the first data line, or one column of sub-pixels extending in the second direction are connected to the second data line;
   at least one column of sub-pixels is arranged between two columns of sub-pixels connected with the same data line, and all sub-pixels in one column of sub-pixels are connected with the same data line;
   the two columns of sub-pixels connected with the same data line comprise a first column of sub-pixels and a second column of sub-pixels, the first column of sub-pixels is adjacent to the same data line, a third column of sub-pixels is arranged between the second column of sub-pixels and the same data line, and all sub-pixels in the second column of sub-pixels are connected with the same data line through a plurality of connecting lines, the plurality of connecting lines are connected with respective sub-pixels in the second column of sub-pixels in one-to-one correspondence and arranged at intervals, and at least one connecting line is arranged between adjacent sub-pixels in the third column of sub-pixels.

2. The array substrate according to claim 1, wherein the plurality of gate lines comprise a first gate line and a second gate line alternately arranged in the second direction, a gate line pair formed by the first gate line and the second gate line is provided between two adjacent sub-pixels arranged in the second direction.

3. The array substrate according to claim 1, wherein the one column of sub-pixels extending in the second direction are all connected to a same data line.

4. The array substrate according to claim 1, wherein among the sub-pixels arranged in the first direction, an odd number of sub-pixels are provided between two sub-pixels connected to a same data line.

5. The array substrate according to claim 4, wherein among the sub-pixels arranged in the first direction, one sub-pixel is provided between the two sub-pixels connected to the same data line.

6. The array substrate according to claim 1, wherein among the sub-pixels arranged in the first direction, two sub-pixels located on both sides of a same data line and next to the same data line are connected to a same gate line.

7. The array substrate according to claim 1, wherein among the sub-pixels arranged in the first direction, two sub-pixels located on both sides of a same data line and next to the same data line are connected to different data lines.

8. The array substrate according to claim 1, wherein the plurality of sub-pixels are divided into a first sub-pixel group and a second sub-pixel group alternately arranged in the first direction, each sub-pixel group comprises two columns of sub-pixels extending in the second direction and arranged in the first direction;
one sub-pixel group is between the first data line and the second data line, which are adjacent, and two sub-pixels arranged in the first direction in a respective sub-pixel group are respectively connected to the first data line and the second data line on both sides of the respective sub-pixel group;
each of the sub-pixels in the first sub-pixel group is connected to the data line close to the sub-pixel, and each of the sub-pixels in the second sub-pixel group is connected to the data line away from the sub-pixel.

9. The array substrate according to claim 1, wherein one column of sub-pixels extending in the second direction have the same color, and the two adjacent sub-pixels arranged in the first direction have different colors.

10. The array substrate according to claim 9, wherein adjacent sub-pixels with a same color and arranged in the first direction are respectively connected to the first data line and the second data line.

11. The array substrate according to claim 2, wherein among the sub-pixels arranged in the first direction, one sub-pixel is provided between two sub-pixels connected to a same data line.

12. The array substrate according to claim 2, wherein among the sub-pixels arranged in the first direction, two sub-pixels located on both sides of a same data line and next to the same data line are connected to a same gate line.

13. The array substrate according to claim 2, wherein the plurality of sub-pixels are divided into a first sub-pixel group and a second sub-pixel group alternately arranged in the first direction, each sub-pixel group comprises two columns of sub-pixels extending in the second direction and arranged in the first direction;
one sub-pixel group is between the first data line and the second data line, which are adjacent, and two sub-pixels arranged in the first direction in a respective sub-pixel group are respectively connected to the first data line and the second data line on both sides of the respective sub-pixel group;
each of the sub-pixels in the first sub-pixel group is connected to the data line close to the sub-pixel, and each of the sub-pixels in the second sub-pixel group is connected to the data line away from the sub-pixel.

14. The array substrate according to claim 2, wherein one column of sub-pixels extending in the second direction have the same color, and two adjacent sub-pixels arranged in the first direction have different colors, and adjacent sub-pixels with a same color and arranged in the first direction are respectively connected to the first data line and the second data line.

15. The array substrate according to claim 1, wherein a touch electrode line extending in the second direction is between the two columns of sub-pixels between the first data line and the second data line.

16. A display device, comprising an array substrate including:
a plurality of sub-pixels arranged in an array along a first direction and a second direction, wherein the first direction and the second direction intersect;
a plurality of gate lines extending in the first direction and arranged in the second direction; and
a plurality of data lines extending in the second direction and arranged in the first direction, wherein the plurality of data lines comprise a first data line and a second data line alternately arranged in the first direction, two columns of sub-pixels extending in the second direction and arranged in the first direction are arranged between the first data line and the second data line, the first data line and the second data line are respectively configured to transmit voltages of different polarities, and different sub-pixels connected to a same data line are connected to different gate lines;
wherein two adjacent sub-pixels arranged in the first direction are respectively connected to the first data line and the second data line, and
one column of sub-pixels extending in the second direction are connected to the first data line, or one column of sub-pixels extending in the second direction are connected to the second data line;
at least one column of sub-pixels is arranged between two columns of sub-pixels connected with a same data line, and all sub-pixels in one column of sub-pixels are connected with the same data line;
the two columns of sub-pixels connected with the same data line comprise a first column of sub-pixels and a second column of sub-pixels, the first column of sub-pixels is adjacent to the same data line, a third column of sub-pixels is arranged between the second column of sub-pixels and the same data line, and all sub-pixels in the second column of sub-pixels are connected with the same data line through a plurality of connecting lines, the plurality of connecting lines are connected with respective sub-pixels in the second column of sub-pixels in one-to-one correspondence and arranged at intervals, and at least one connecting line is arranged between adjacent sub-pixels in the third column of sub-pixels.

17. The array substrate according to claim 1, wherein an odd column of sub-pixels is arranged between two columns of sub-pixels connected with the same data line.

18. The array substrate according to claim 1, wherein one column of sub-pixels is arranged between two columns of sub-pixels connected with the same data line.

19. The array substrate according to claim 1, wherein each sub-pixel in the at least one column of sub-pixels arranged between the two columns of sub-pixels connected with the same data line is connected with at least one data line which is different from the same data line connected with the two columns of sub-pixels.

20. The array substrate according to claim 1, wherein the third column of sub-pixels and the second column of sub-pixels are respectively connected with different data lines, and all sub-pixels in the second column of sub-pixels and all sub-pixels in the third column of sub-pixels are connected with corresponding data lines through the connecting lines, and the connecting lines connected with the second column of sub-pixels and the connecting lines connected with the third column of sub-pixels are not overlapped and alternately arranged in the second direction.

* * * * *